(12) United States Patent
Admoni et al.

(10) Patent No.: US 10,837,540 B2
(45) Date of Patent: Nov. 17, 2020

(54) LUBRICATION SYSTEM AND A METHOD FOR LUBRICATING A TRANSMISSION SYSTEM COMPONENT

(71) Applicant: APPLIED MATERIALS ISRAEL LTD., Rehovot (IL)

(72) Inventors: Erez Admoni, Petach Tikva (IL); Efim Vinnitsky, Ashkelon (IL)

(73) Assignee: APPLIED MATERIALS ISRAEL LTD., Rehovot (IL)

( * ) Notice: Subject to any disclaimer, the term of this patent is extended or adjusted under 35 U.S.C. 154(b) by 448 days.

(21) Appl. No.: 15/709,271

(22) Filed: Sep. 19, 2017

(65) Prior Publication Data
US 2019/0085968 A1  Mar. 21, 2019

(51) Int. Cl.
*F16H 57/04*   (2010.01)
*F16C 33/66*   (2006.01)
*F16C 29/06*   (2006.01)

(52) U.S. Cl.
CPC ....... *F16H 57/0408* (2013.01); *F16C 33/664* (2013.01); *F16C 33/6659* (2013.01); *F16H 57/045* (2013.01); *F16H 57/0436* (2013.01); *F16C 29/0635* (2013.01); *F16C 2300/62* (2013.01)

(58) Field of Classification Search
CPC ...... F16H 57/0408; F16C 33/10; F16C 29/04; F16C 33/664; F16C 33/6659
See application file for complete search history.

(56) References Cited

U.S. PATENT DOCUMENTS

| | | | | |
|---|---|---|---|---|
| 6,082,899 A * | 7/2000 | Suzuki | ................ | F16C 29/0609 184/5 |
| 6,125,968 A * | 10/2000 | Shirai | ................... | F16C 29/008 184/100 |
| 6,250,804 B1 * | 6/2001 | Hsu | ..................... | F16C 33/6651 384/13 |
| 6,401,867 B1 * | 6/2002 | Michioka | ................. | B23Q 1/58 184/5 |
| 7,465,095 B2 * | 12/2008 | Agari | .................. | F16C 29/0611 384/13 |
| 7,543,684 B2 * | 6/2009 | Chin-Pei | ................. | F16C 29/00 184/5 |
| 7,556,430 B2 * | 7/2009 | Wu | ..................... | F16C 29/0609 184/5 |
| 8,147,141 B2 * | 4/2012 | Fumoto | ............... | F16C 29/0609 384/13 |
| 8,215,840 B2 * | 7/2012 | Hsiao | .................. | F16C 33/6659 184/5 |
| 8,251,586 B2 * | 8/2012 | Kondo | ................ | F16O 29/0609 184/5 |

(Continued)

*Primary Examiner* — Michael R Mansen
*Assistant Examiner* — Mark K Buse
(74) *Attorney, Agent, or Firm* — Kilpatrick Townsend & Stockton LLP

(57) ABSTRACT

A method and a lubrication system for lubricating a transmission system component. The lubrication system may include a lubrication system reservoir for storing a lubrication liquid; and a distribution system. The distribution system may be configured to refill, with the lubrication liquid, a transmission system reservoir that is configured to lubricate the transmission system component. The refill occurs while the transmission system component and the lubrication system are positioned within a vacuum chamber.

10 Claims, 14 Drawing Sheets

(56) References Cited

U.S. PATENT DOCUMENTS

| | | | | |
|---|---|---|---|---|
| 8,668,051 B2* | 3/2014 | Chen | ................... | F16N 11/08 |
| | | | | 184/37 |
| 8,721,180 B2* | 5/2014 | Li | ................... | F16C 33/6681 |
| | | | | 384/13 |
| 9,062,716 B2* | 6/2015 | Dittmar | ............... | F16C 33/6625 |
| 9,222,515 B2* | 12/2015 | Chang | ................ | F16C 33/6659 |
| 10,054,160 B1* | 8/2018 | Wang | ................. | F16O 29/0669 |
| 10,422,377 B2* | 9/2019 | Hosaka | .............. | F16H 25/2238 |
| 2003/0164264 A1* | 9/2003 | Luo | ................... | F16C 29/064 |
| | | | | 184/5 |
| 2005/0201644 A1* | 9/2005 | Lee | .................. | F16C 29/0642 |
| | | | | 384/13 |
| 2008/0232724 A1* | 9/2008 | Kuwabara | ............ | F16O 29/065 |
| | | | | 384/13 |
| 2010/0024587 A1* | 2/2010 | Aso | ................... | F16C 29/008 |
| | | | | 74/490.09 |
| 2011/0103723 A1* | 5/2011 | Hsiao | ................ | F16C 29/0633 |
| | | | | 384/13 |
| 2011/0170808 A1* | 7/2011 | Chen | ................. | F16C 29/008 |
| | | | | 384/13 |
| 2011/0170809 A1* | 7/2011 | Chen | ................. | F16C 29/0633 |
| | | | | 384/13 |
| 2015/0219160 A1* | 8/2015 | Nishiyama | .......... | F16C 33/6659 |
| | | | | 384/13 |

* cited by examiner

LUBRICATION SYSTEM AND A METHOD FOR LUBRICATING A TRANSMISSION SYSTEM COMPONENT

TECHNICAL FIELD

Embodiments of the present invention relate to lubrication systems and methods for lubricating a transmission system component that is positioned within a vacuum chamber.

BACKGROUND

A vacuum chamber may be used for various processes such as but not limited to an inspection process, a metrology process, a review process and a manufacturing process. For example—a scanning electron microscope review defects of an object that is located within a vacuum chamber.

The various processes may involve moving the object that is located within the vacuum chamber by a transmission system. Certain transmission system components may require lubrication. The certain transmission system components may include, for example, gears and bearings. The lubrication of the certain transmission system components requires to open the vacuum chamber and expose the certain transmission system components. The opening of the vacuum chamber is time consuming and reduces the availability of the vacuum chamber.

There is a growing need to provide an efficient method and a system for lubricating the certain parts of the transmission system.

SUMMARY

There may be provided lubrication system for lubricating a transmission system component, the lubrication system may include (a) a lubrication system reservoir for storing a lubrication liquid; and a distribution system. The distribution system may be configured to refill, with the lubrication liquid, a transmission system reservoir that may be configured to lubricate the transmission system component. The refill occurs while the transmission system component and the lubrication system may be positioned within a vacuum chamber.

The lubrication system distribution system may include a conduit that may be coupled to a lubrication port of the transmission system reservoir. The lubrication system distribution system may include a pump. The lubrication system distribution system may include a micro-pump. The lubrication system distribution system may include a valve. The lubrication system distribution system may include a lubrication liquid flow control unit that may be positioned above the lubrication system reservoir. The lubrication system distribution system may include a lubrication liquid flow control unit that may be positioned below the lubrication system reservoir.

The lubrication system distribution system may be configured to refill at least one additional transmission system reservoir that may be configured to lubricate at least one additional transmission system component. The lubrication system lubrication system may be configured to perform the refill at an average rate that may be below cubic centimeter per month.

The lubrication system lubrication system reservoir may be mechanically coupled to the transmission system component. The lubrication system lubrication system may include a housing that may be mechanically coupled to the transmission system component. The distribution system may include a lubrication liquid flow control unit that may be attached to the housing. The lubrication liquid flow control unit may be positioned within a space defined by the housing. The lubrication liquid flow control unit may be positioned above the lubrication system reservoir.

There may be provided a method for lubricating a transmission system component, the method system may include refilling with a lubrication liquid, and by a lubrication system, a transmission system reservoir that may be configured to lubricate the transmission system component; wherein the refilling occurs while the transmission system component and the lubrication system may be positioned within a vacuum chamber; wherein the refilling may include retrieving the lubrication liquid from a lubrication system reservoir and distributing the lubrication liquid to the transmission system reservoir by a distribution system of the lubrication system.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof may best be understood by reference to the following detailed description when read with the accompanying drawings in which:

Figure 1:
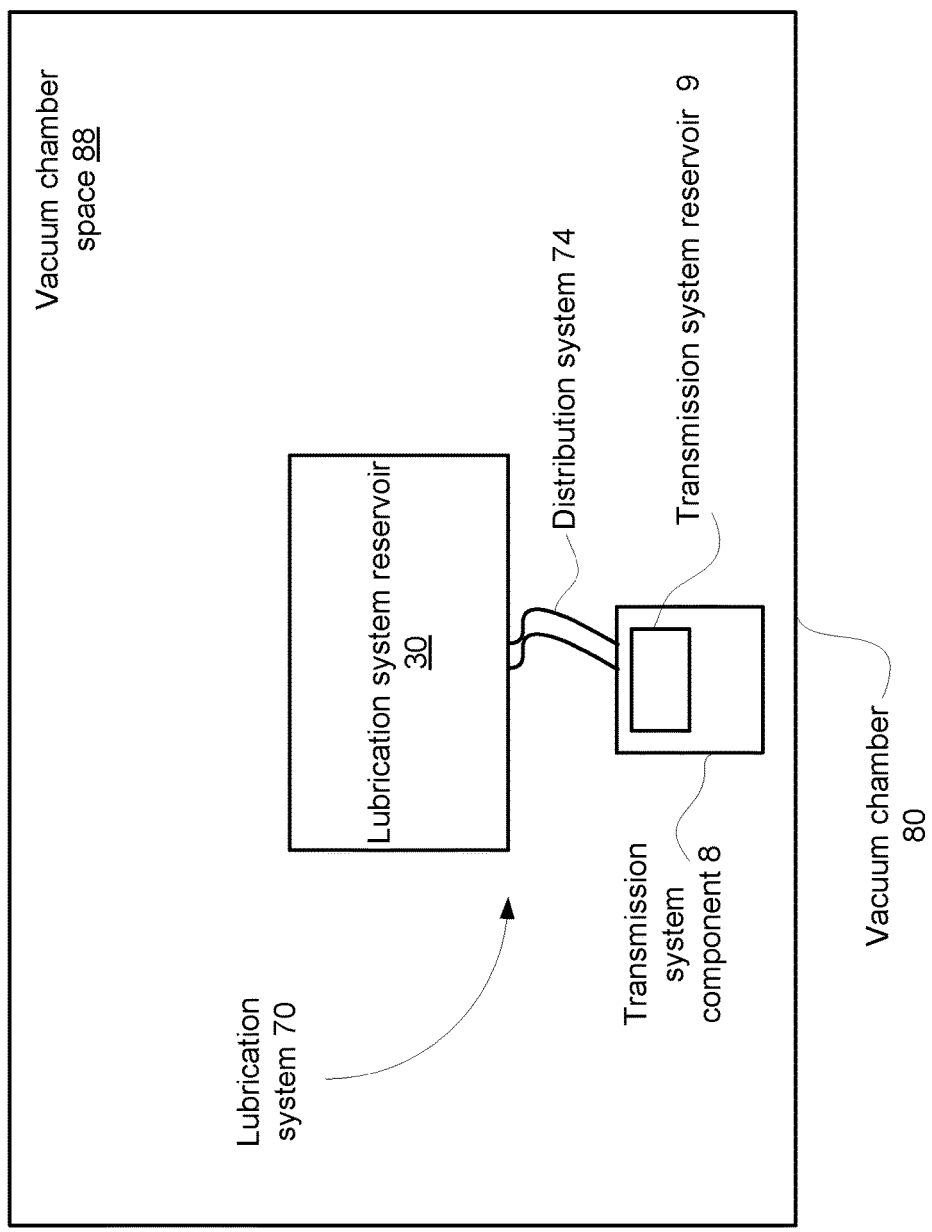
FIG. 1 illustrates an example of a vacuum chamber, a lubrication system and a transmission system component.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method. Any reference in the specification to a system should be applied mutatis mutandis to a method that may be executed by the system. The assignment of the same reference numbers to various components may indicate that these components are similar to each other.

FIG. 1 illustrates a vacuum chamber 80 that defines vacuum chamber space 88. Transmission system component 8 and lubrication system 70 are positioned in vacuum chamber space 88. Transmission system component 8 includes transmission system reservoir 9. Transmission system component may be fluidly coupled to transmission system reservoir 9 without including the transmission system reservoir 9.

Transmission system component 8 belongs to a transmission system that is located in vacuum chamber 80. The transmission system may move one or more objects within the vacuum chamber.

The transmission system may include at least one other transmission system component that does not include transmission system reservoir and is not fluidly coupled to a transmission system reservoir.

Transmission system component 8 is lubricated, directly or indirectly (via a transmission system reservoir), by lubrication system 70 in order to reduce mechanical friction. Lubrication system 70 includes lubrication system reservoir 30 for storing a lubrication liquid; and distribution system 74. The distribution system 74 may be configured to distribute the lubrication liquid from the lubrication system reservoir 30 to the transmission system reservoir 9. Additionally or alternatively, distribution system 74 may be configured to distribute the lubrication liquid from the lubrication system reservoir 30 to the transmission system component 8.

The lubrication system reservoir 30 may store more lubrication liquid than the transmission system reservoir 9. For example, the lubrication system reservoir 30 may store at least three times the amount of lubrication liquid than the transmission system reservoir 9. Accordingly, the transmission system reservoir 9 may be refilled several times by the lubrication system 70 while the vacuum chamber is closed.

Figure 2:
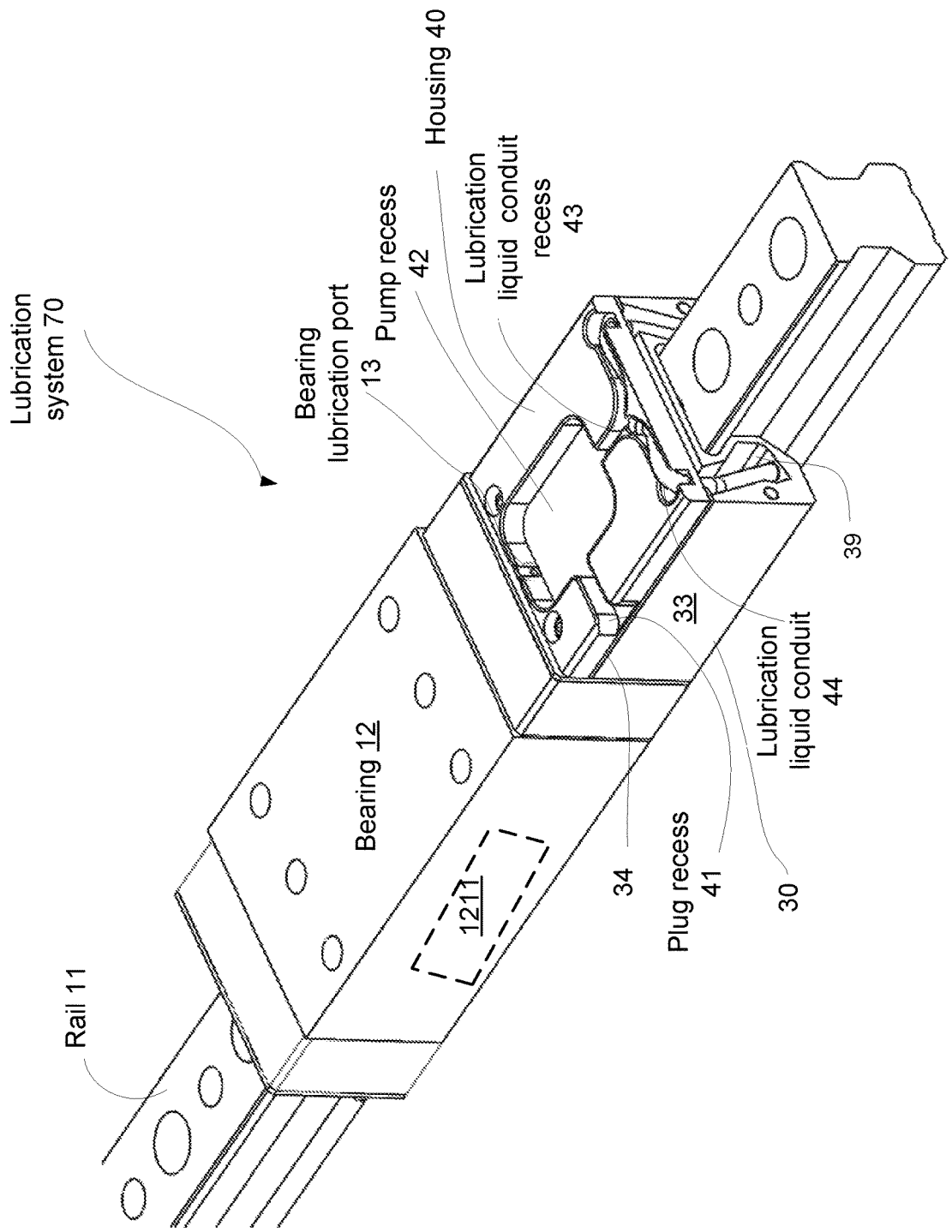
FIG. 2 illustrates an example of a rail, a bearing and a lubrication system.

FIG. 2 illustrates an example of rail 11, bearing 12 and lubrication system reservoir 30 of lubrication system 70. Bearing 12 is a linear bearing and slides along the rail 11. The rail 11 has a polygon-shaped cross section and the bearing 12 has an interior part that fits the polygon-shaped cross section of the rail 11.

Bearing 12 may be moved, by a linear motor (not shown) along rail 11. Bearing 12 has a bearing lubrication port 13 for feeding a bearing reservoir 1211. Prior art methods for refilling the bearing reservoir 1211 required opening the vacuum chamber and manually injecting lubrication fluid using a syringe.

The suggested method refills the bearing reservoir without opening the vacuum chamber. Bearing reservoir 1211 is smaller than the lubrication system reservoir 30. Lubrication system reservoir 30 may store more lubrication fluid than bearing reservoir 1211 and may refill bearing reservoir 1211 multiple times.

The lubrication system reservoir 30 is connected to the bearing 12. Lubrication system reservoir 30 may or may not follow the movement of the bearing 12. The lubrication system reservoir 30 has a box-shaped exterior and a polygon-shaped interior walls that surround rail 11. The lubrication system reservoir 30 may be connected to any side of bearing 12 or to the top of bearing 12. The lubrication system reservoir 30 may be coupled to bearing 12 via one or more liquid conduits. The lubrication system reservoir 30 is illustrated in FIG. 2 as including sidewall 33, upper surface 34.

Housing 40 is positioned above lubrication system reservoir 30 and may form a top cover of the lubrication system reservoir 30. Housing 40 can include:
  a. Pump recess 42 for receiving a pump.
  b. Plug recess 41 for receiving an electrical plug of the pump.
  c. lubrication liquid conduit recess 43 accommodates lubrication liquid conduit 44.

The lubrication system reservoir 30 and housing 40 define an interior space 39 for storing lubrication liquid. Interior space 39 partially surrounds rail 11—and has an inverted U-shape cross section. Interior space 39 includes a right part, a left part, and a middle part. The middle part is positioned between housing 40 and base 31.

Figure 3:
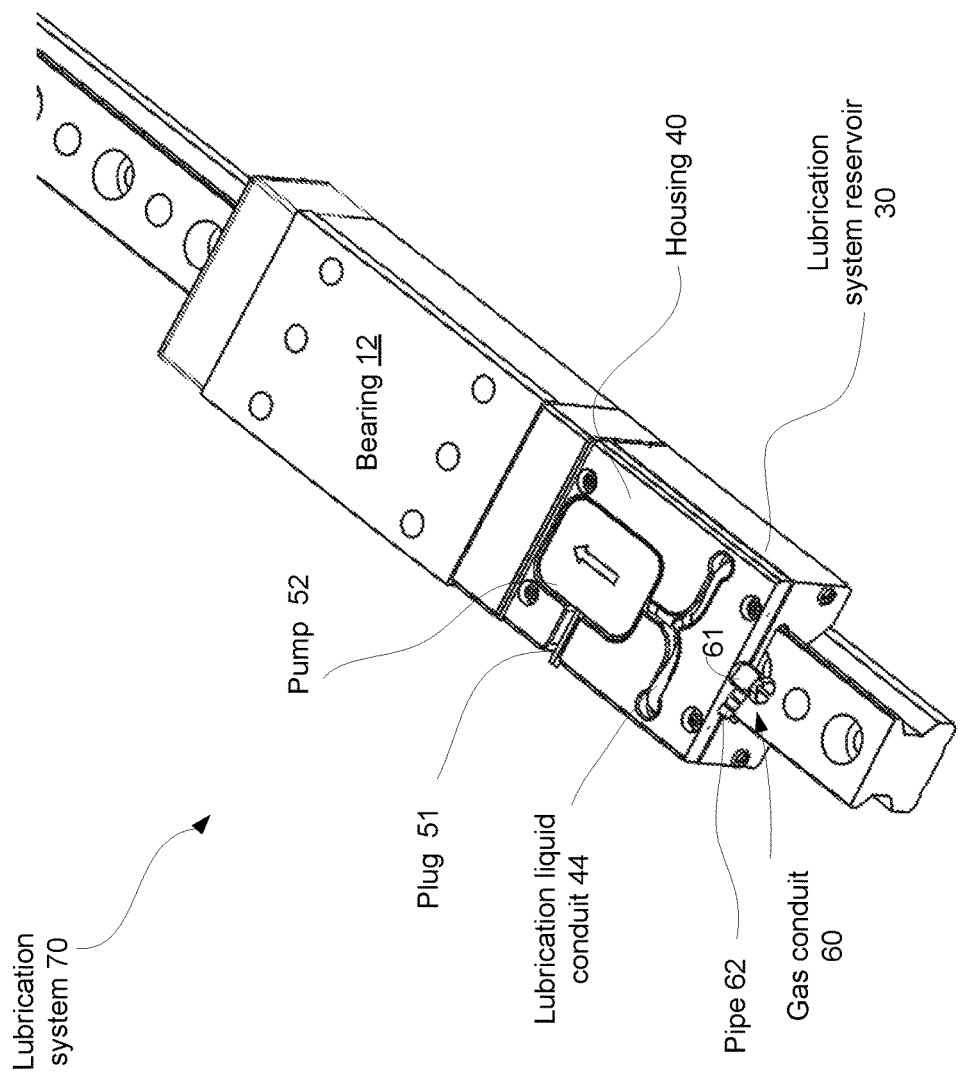
FIG. 3 illustrates an example of a rail, a bearing, and a lubrication system.

FIG. 3 illustrates bearing 12, a rail, housing 40, pump 52, electrical plug 51, lubrication liquid conduit 44, and lubrication system reservoir 30 of lubrication system 70. Lubrication liquid conduit 44 provides a path between the lubrication liquid within interior space 39 and a flow control unit (not shown) of the lubrication system. The interior space 39 partially surrounds rail 11—and has an inverted U-shape cross section. Interior space 39 includes a right part, a left part, and a middle part. The middle part is positioned between housing 40 and base 31.

Pump 52 is positioned within pump recess 42 and has an output port (not shown) that is fluidly coupled to bearing lubrication port 13. An input port of pump 52 is fluidly coupled to lubrication liquid conduit 44. Pump 52 may be configured to provide a small volumetric flow of the lubrication fluid—for example down to an order of 0.01 cc, in a stable, controllable, and repeatable manner.

When using a pump such as micropump mp6 of Bartels Mikrotechnik GmbH, of Dortmund, Germany, the pump was operated to output about 0.5 cc of the lubrication fluid each two months. Other rates may be applied. Other types of pumps may be used. For example—pump 52 may be a piezo pump, a solenoid activated pump or any type of pump.

Electrical plug 51 is electrically coupled to pump 52 and is positioned within plug recess 41. Plug 51 can be connected to control links, communication links and/or power links.

FIG. 3 also illustrates a gas conduit 60 is used for pressure equalization between interior space 39 and the vacuum chamber space. Gas conduit 60 is connected to opening of the housing 40. Gas conduit 60 is positioned and shaped in order to reduce the chances of a leakage of lubrication liquid from interior space 39 to the vacuum chamber space. Especially—gas conduit 60 is positioned above the interior space 39, gas conduit has a base 61 that is oriented in relation to a pipe 62, and an output of the pipe 62 is positioned above base 61.

Figure 4:
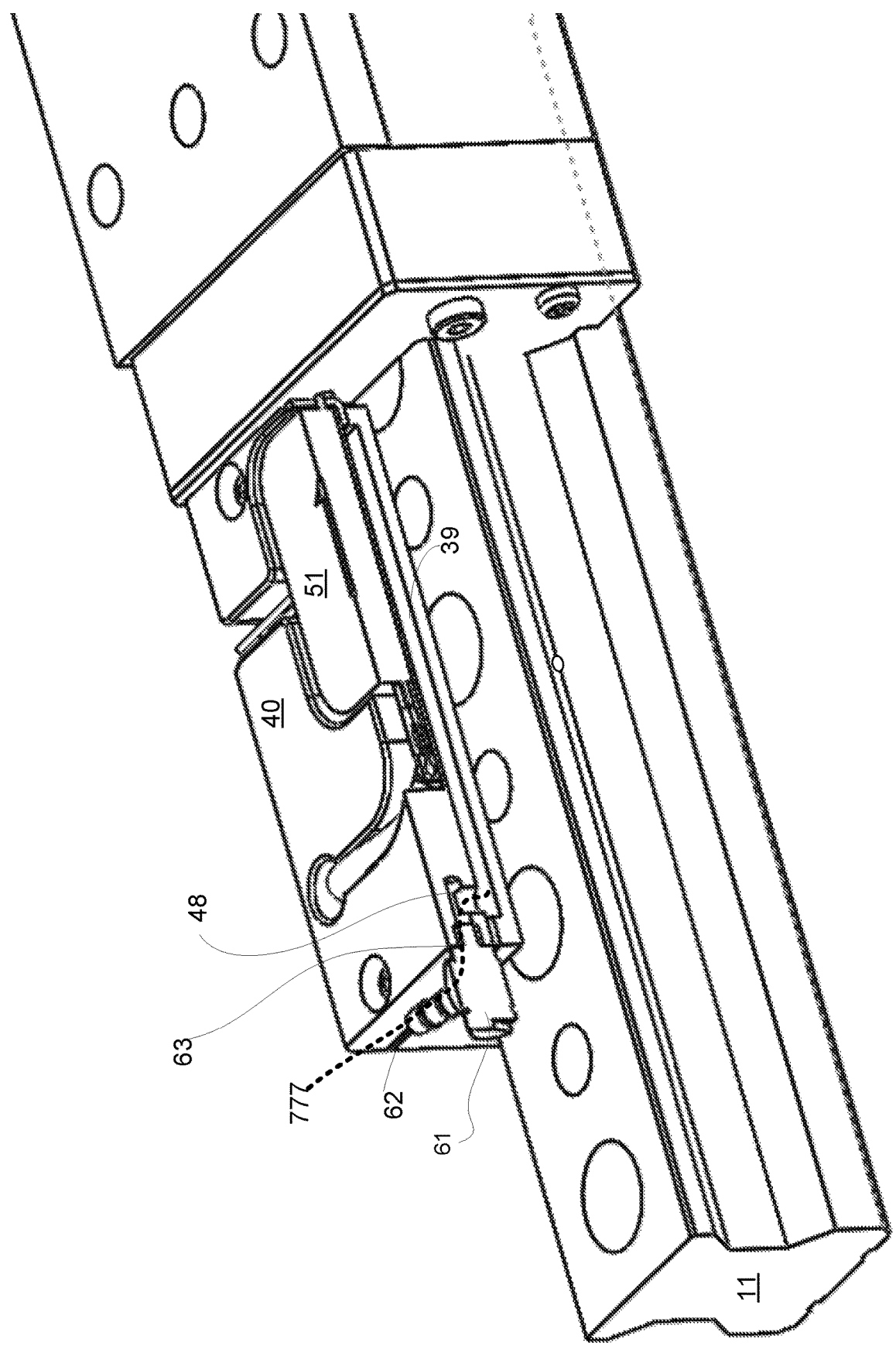
FIG. 4 is an example of a cross section of a lubrication system.

FIG. 4 illustrates a cross section of housing 40 and lubrication system reservoir 30. FIG. 4 illustrates an evacuation path 777 of gas from interior space 39. The evacuation path 777 passes through base interior space 63 (of base 61), through internal recess 48 (of housing 40) and through pipe 62.

Gas from interior space 39 may flow through internal recess 48, base interior space 63 and pipe 62 and exits lubrication system 70. Gas from vacuum chamber space may flow through pipe 62, base interior space 63, internal recess 48 and enters interior space 39.

Figure 5:
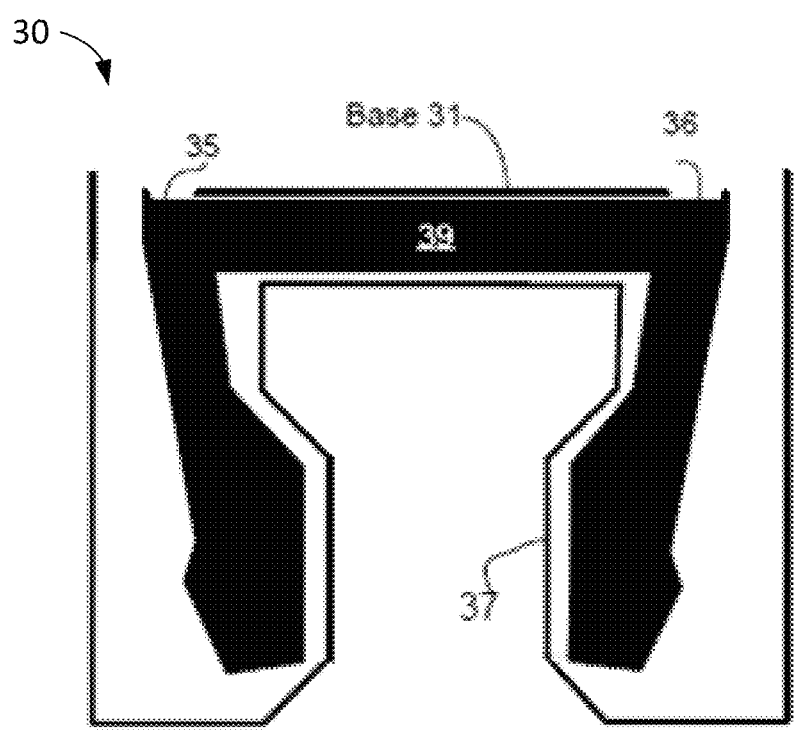
FIG. 5 illustrates a cross section of a housing and a lubrication system reservoir of a lubrication system.

FIG. 5 illustrates a cross section of lubrication system reservoir 30. FIG. 5 illustrates inner walls 37 that interface with rail 11, right opening 35 and left opening 36 that are formed in base 31.

Figure 6:
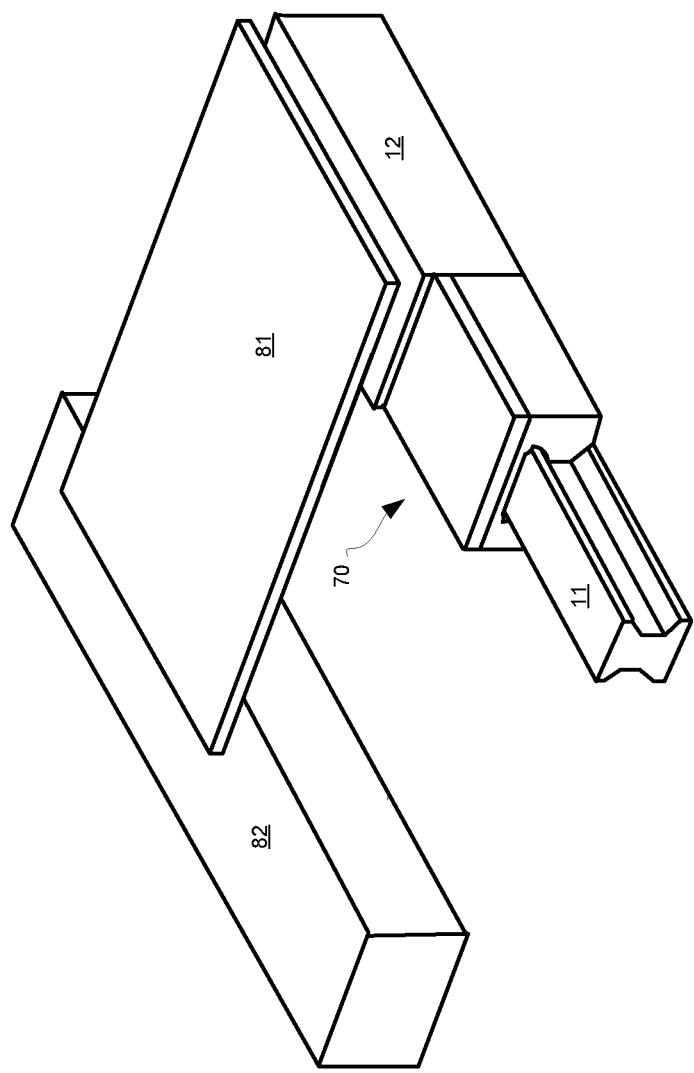
FIG. 6 is an example of a linear motor, a mechanical interface, a lubrication system, a bearing and a rail.

FIG. 6 is an example of a linear motor 82, mechanical interface 81, lubrication system 70, bearing 12 and rail 11. Linear motor 82 is mechanically coupled to bearing 12 via mechanical interface 81. Linear motor 82 moves bearing 12 along rail 11.

Figure 7:
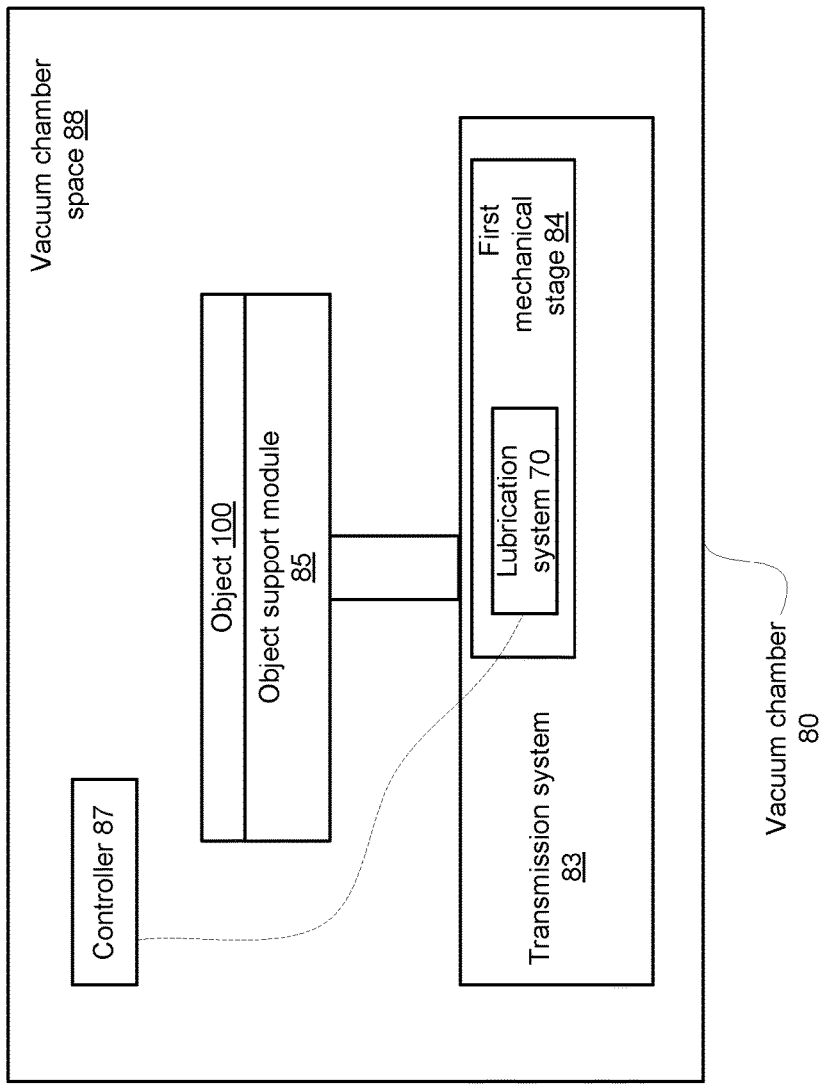
FIG. 7 is an example of a lubrication system, a vacuum chamber, a transmission system, an object support module and an object.

FIG. 7 is an example of a vacuum chamber 80, controller 87, transmission system 83, object support module 85 and object 100. Vacuum chamber 80 defines vacuum chamber space 88. Vacuum chamber 80 may include one or more openings that enable various tools to inspect object 100, to review object 100, to measure object 100, or to process object 100.

Object support module 85 supports object 100. Object support module 85 is moved by transmission system 83. Transmission system 83 may include a first mechanical stage 84. Lubrication system 70 is controlled by controller 87 and is included in first mechanical stage 84. For example—first mechanical stage 84 may include all the elements of FIG. 9—such as the linear motor, the mechanical interface, the rail, the bearing, and the lubrication system 70.

FIG. 7 is an example of lubrication system 70, vacuum chamber 80, controller 87, transmission system 83, object support module 85 and object 100. Vacuum chamber 80 defines a vacuum chamber space 88. Vacuum chamber 80 may include one or more openings that enable various tools to inspect object 100, to review object 100, to measure object 100, or to process object 100.

Object support module 85 supports object 100. Object support module 85 is moved by transmission system 83. Transmission system 83 may be lubricated by lubrication system 70. Lubrication system 70 may be controlled by controller 87.

Figure 8:
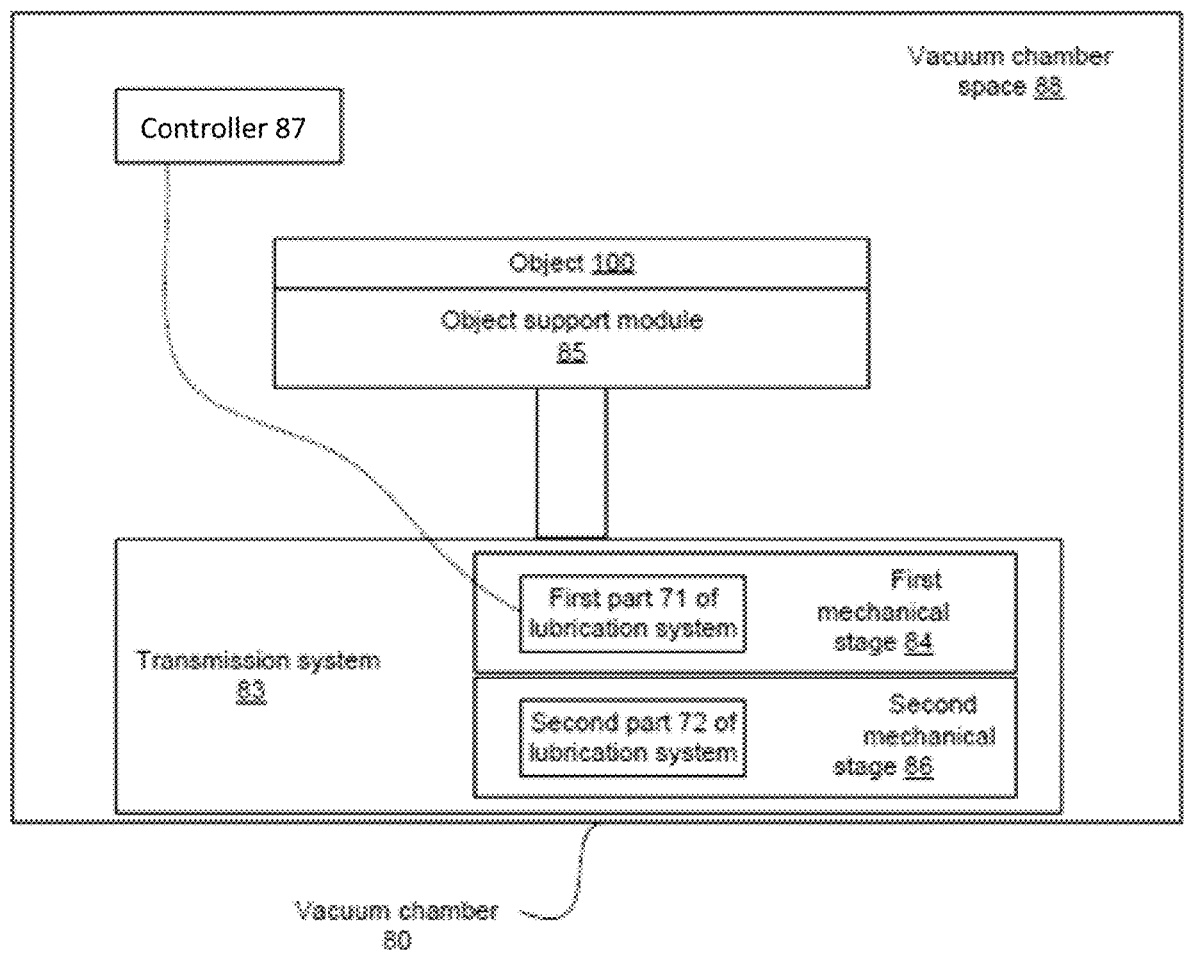
FIG. 8 is an example of a lubrication system, a vacuum chamber, a transmission system, an object support module and an object.

FIG. 8 is an example of lubrication system 70, vacuum chamber 80, controller 87, transmission system 83, object support module 85 and object 100. Transmission system 83 includes a first mechanical stage 84 and second mechanical stage 86. Each one of the first mechanical stage and the second mechanical stage may be an X-axis stage, a Y-axis stage, a Z-axis stage, a rotational stage, or a tilt stage. X-axis and Y-axis are virtual axes that are in a plane that is parallel to object 100 and the Z-axis is normal to object 100.

The lubrication system 70 is split to first part 71 of lubrication system and second part 72 of lubrication system. First part 71 of lubrication system may lubricate one or more transmission system components of first mechanical stage 84. Second part 72 of lubrication system may lubricate one or more transmission system components of second mechanical stage 86.

Controller 87 may control first part 71 of lubrication system and second part 72 of lubrication system. First part 71 of lubrication system and second part 72 of lubrication system may share one or more components such as a conduit, a reservoir. Alternatively—first part 71 of lubrication system and second part 72 of lubrication system may not share any components.

Figure 9:
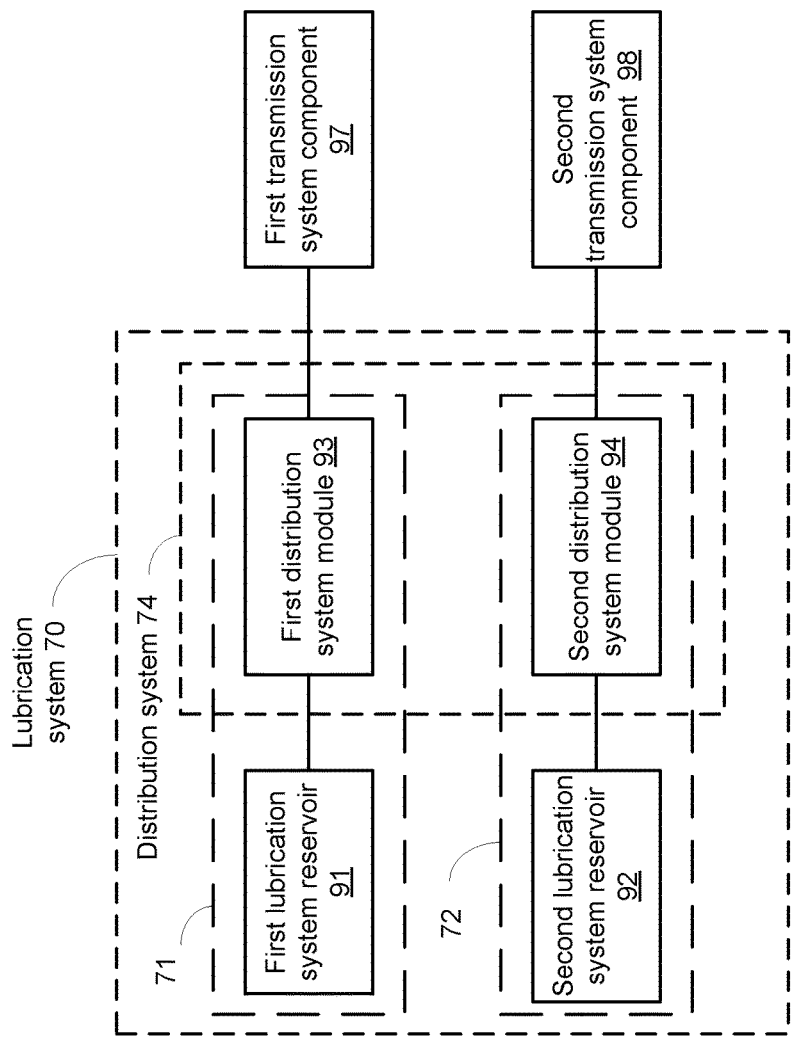
FIG. 9 illustrates an example of a first part of a lubrication system, a first transmission system component and a second transmission system component.

FIG. 9 illustrates first part 71 of lubrication system, second part 72 of lubrication system, first transmission system component 97 and second transmission system component 98. First part 71 of transmission system includes first lubrication system reservoir 91 and first distribution system module 93. First part 71 of lubrication system is used to lubricate first transmission system component 97. Second part 72 of transmission system includes second lubrication system reservoir 92 and second distribution system module 94. Second part 72 of transmission system is used to lubricate second transmission system component 98.

First distribution system module 93 and second distribution system module 94 belong to distribution system 74. Distribution system 74 may include any combination of conduits, valves, and flow control elements. The lubrication system may include any number of reservoirs, any number of flow control elements and any number of distribution system elements. The number of reservoirs may differ from the number of flow control elements. The number of reservoirs may equal the number of flow control elements.

It may be beneficial to position the reservoir and the flow control element in proximity to the transmission system component that should be lubricated. This proximity enables using shorter conduits that are more immune to mechanical forces and exhibit lower outgassing than longer conduits. Proximity may refer to a distance that does not exceed ten till thirty centimeters.

The lubrication system of any of the figures in the specification may be controlled by one or more controllers. The one or more controllers may control the lubrication process—may instruct the flow control unit when to supply the lubrication fluid, an amount of lubrication fluid to provide, and the like.

The one or more controller may determine one or more lubrication process parameters that define the lubrication process. These one or more parameters may include the type of lubrication (continuous or non-continuous), timing of lubrication operations of the lubrication process, the flow rate of the lubrication liquid, the amount of lubrication liquid to discharge during each lubrication operation, and the like.

The lubrication parameters may be determined in advance, by an operator of the vacuum chamber or by any other user. The lubrication parameters may be responsive to events such as a heating of a transmission system component, a malfunction of the transmission system, a contamination of the vacuum chamber space, and the like. The lubrication parameters may be responsive to the temperature of the vacuum chamber space, a contamination of the vacuum chamber space, a lubrication status of transmission system component, a temperature of a transmission system component, and the like.

The lubrication operations may be executed when the object is not processed or inspected or measured or reviewed. The lubrication operations may be executed when the pressure level of the vacuum chamber space reaches a predefined level—such as an atmospheric level.

Figure 10:
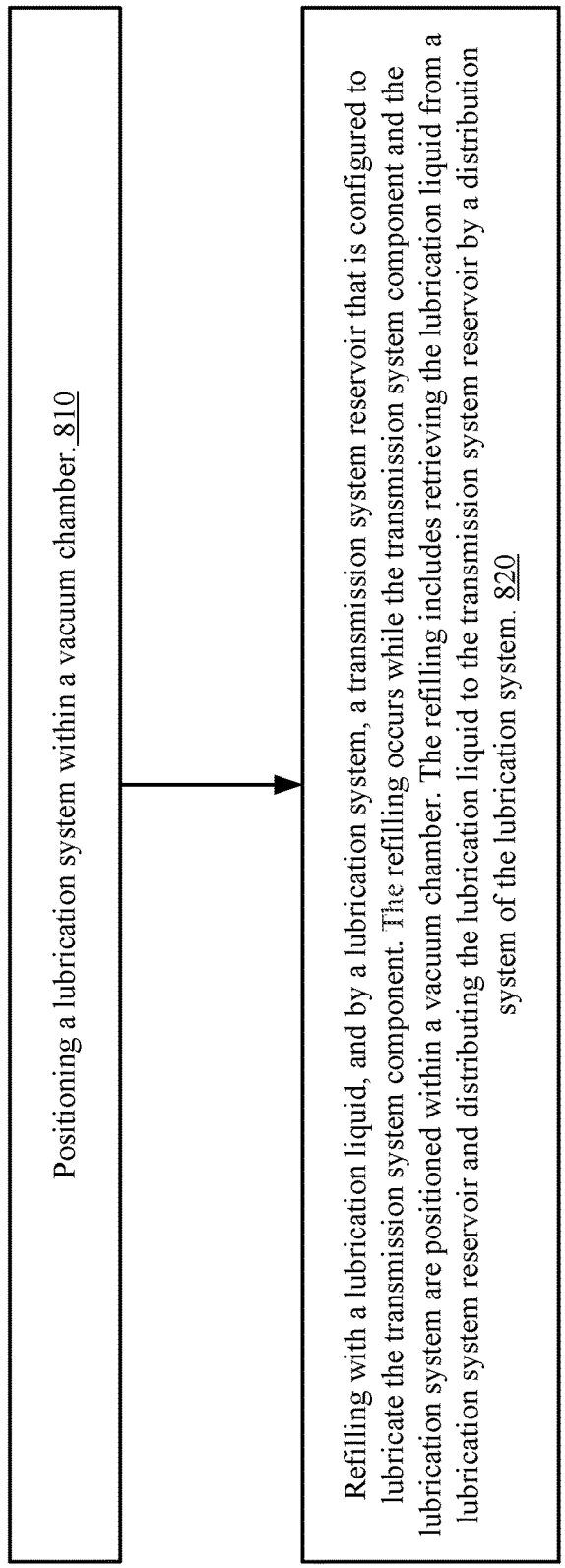
FIG. 10 illustrates an example of method.

FIG. 10 illustrates an example of method 800. Method 800 may start by step 810 of positioning a lubrication system within a vacuum chamber. Step 810 may be followed by step 820 of refilling with a lubrication liquid, and by a lubrication system, a transmission system reservoir that is configured to lubricate the transmission system component.

The refilling occurs while the transmission system component and the lubrication system are positioned within a vacuum chamber. The refilling includes retrieving the lubrication liquid from a lubrication system reservoir and distributing the lubrication liquid to the transmission system reservoir by a distribution system of the lubrication system. The refilling does not require opening the vacuum chamber and thus increases the time period between openings of the vacuum chamber.

Any of the lubrication systems mentioned above may be made of vacuum grade materials—for example be vacuum compatible by ASTM E595 77/84/90 to at-least TML (total mass loss) −1% max. and CVCM 0.1% max.

Figure 11:
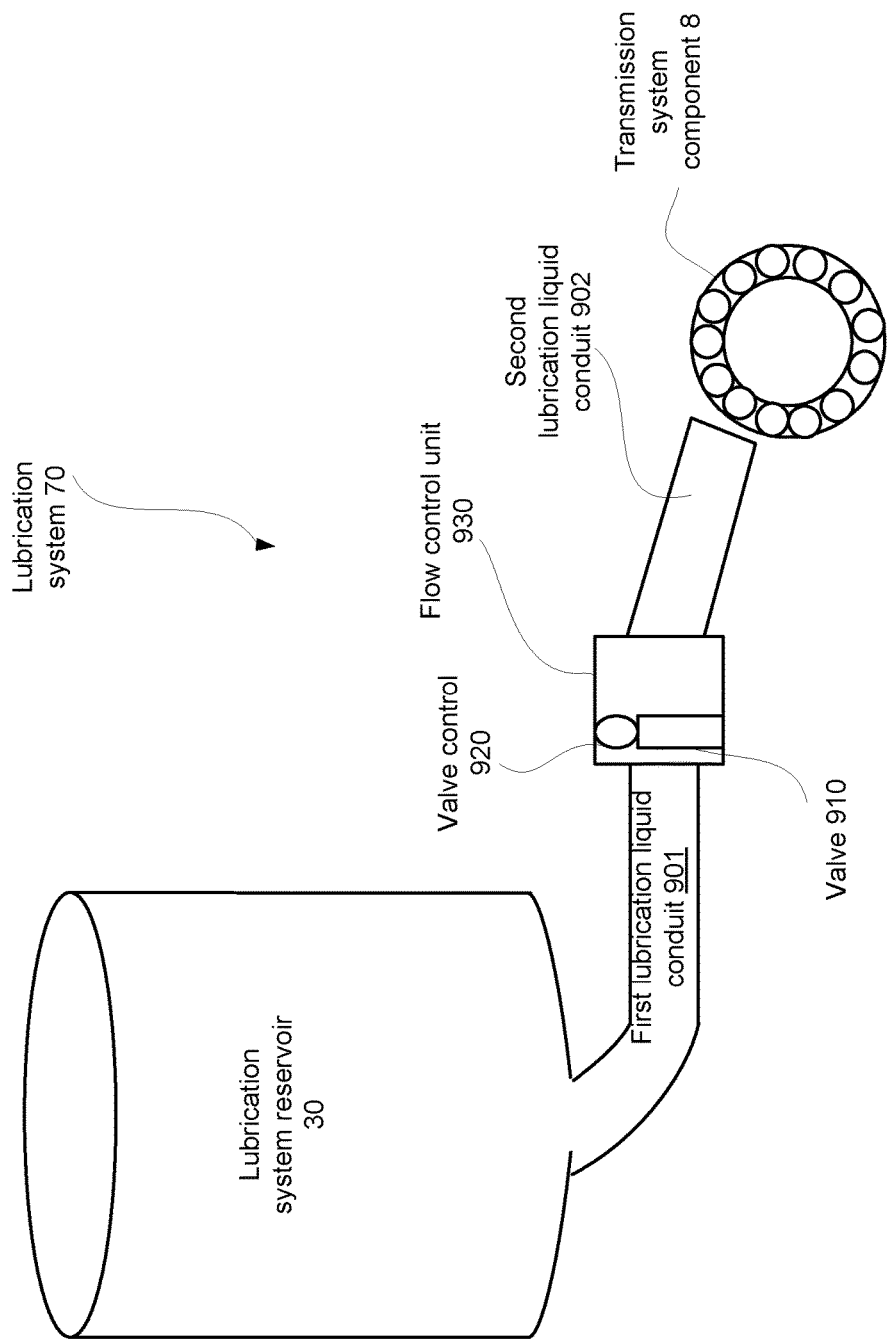
FIG. 11 illustrates an example of a lubrication system and a transmission system component.

FIG. 11 illustrates an example of transmission system component 8 and of lubrication system 70. Lubrication system 70 includes lubrication system reservoir 30, first lubrication liquid conduit 901, second lubrication liquid conduit 902, flow control unit 930 that includes a valve 910 and a valve control unit 920 for controlling valve 910.

First lubrication liquid conduit 901 is positioned above flow control unit 930. Flow control unit 930 is positioned between first lubrication liquid conduit 901 and second lubrication liquid conduit 902. When valve 910 is open lubrication liquid may flow from lubrication system reservoir 30 through first lubrication liquid conduit 901, through flow control unit 930 and through second lubrication liquid conduit 902 to lubricate transmission system component 8.

Figure 12:
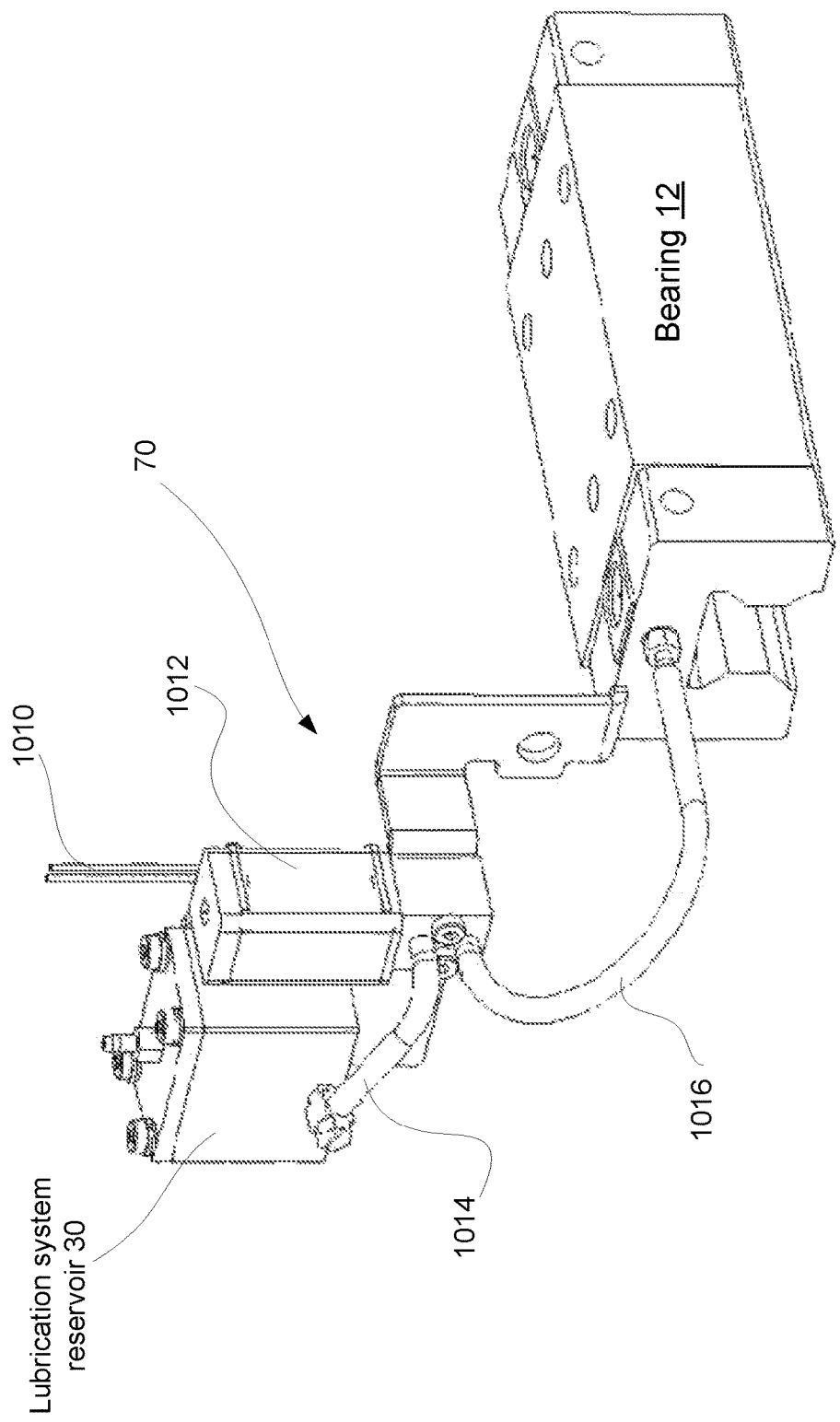
FIG. 12 illustrates an example of a lubrication system and a bearing.

FIG. 12 illustrates an example of bearing 12 and of lubrication system 70. Lubrication system 70 includes lubrication system reservoir 30, first lubrication liquid conduit 1014, second lubrication liquid conduit 1016, flow control unit 1012 that includes a valve and a valve control unit for controlling valve. The valve control unit is fed by control signals conveyed over control lines 1010. When the valve of the flow control unit 1012 is open lubrication liquid may flow from lubrication system reservoir 30 through first lubrication liquid conduit 1014, through flow control unit 1012 and through second lubrication liquid conduit 1016 to lubricate bearing 12.

Figure 13:
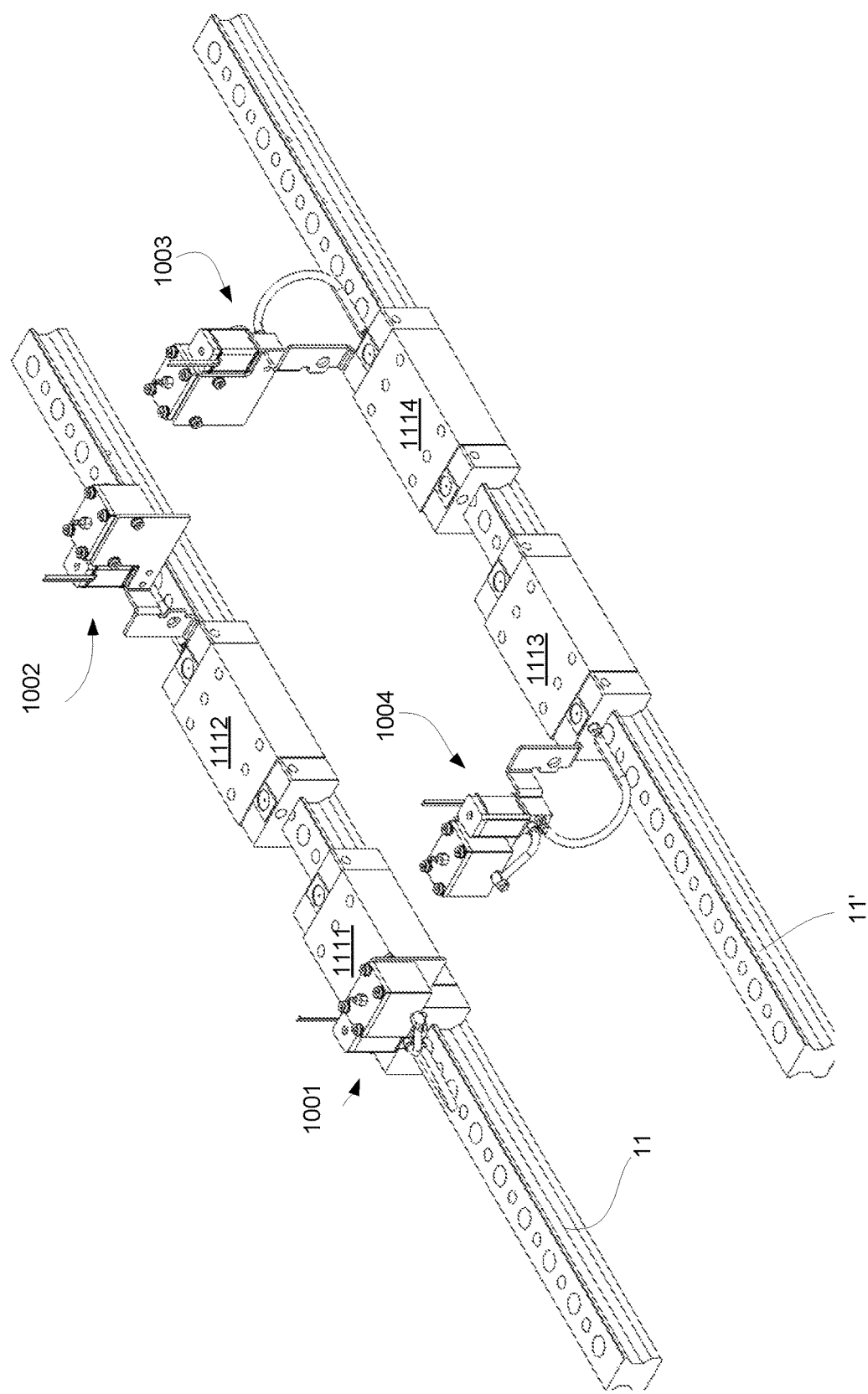
FIG. 13 illustrates an example of four lubrication systems and four bearings.

FIG. 13 illustrates an example of first bearings 1111, second bearing 1112, third bearing 1113, fourth bearing 1114, first lubrication system 1001, second lubrication system 1002, third lubrication system 1003 and fourth lubrication system 1004. First lubrication system 1001 lubricates first bearing 1111. Second lubrication system 1002 lubricates second bearing 1112. Third lubrication system 1003 lubricates third bearing 1113. Fourth lubrication system 1004 lubricates fourth bearing 1114. First bearings 1111 and second bearing 1112 move along rail 11. Third bearing 1113 and fourth bearing 1114 move along another rail 11'. The number of bearings may differ from four. The number of lubrication systems may differ from four.

Figure 14:
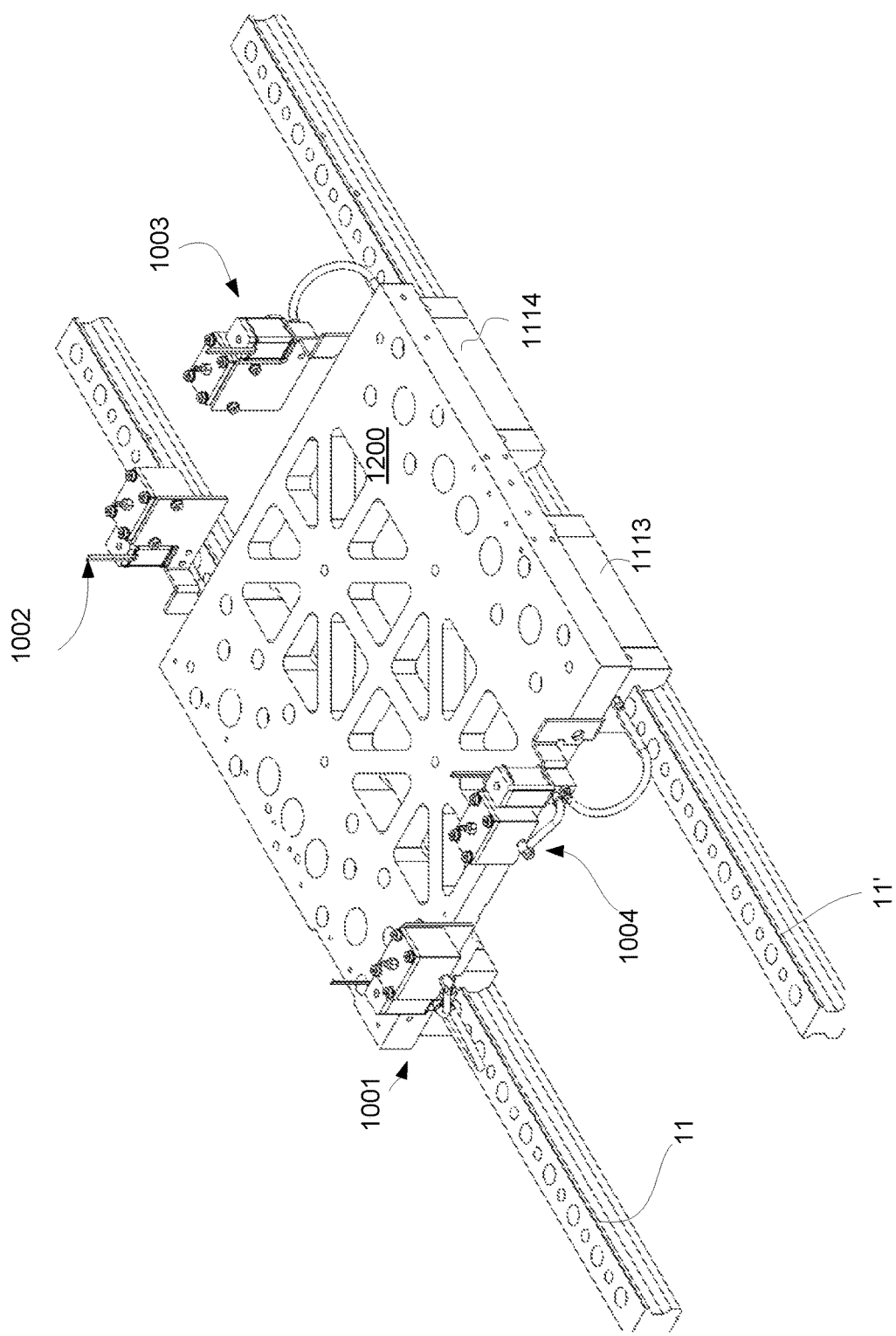
FIG. 14 illustrates an example of four lubrication systems, four bearings and a supporting structure.

FIG. 14 illustrates an example of first lubrication system 1001, second lubrication system 1002, third lubrication system 1003 and fourth lubrication system 1004 and of a supporting structure 1200 that is supported by first bearings (not shown), second bearing (not shown), third bearing 1113, fourth bearing 1114.

In the foregoing specification, the invention has been described with reference to specific examples of embodiments of the invention. It will, however, be evident that various modifications and changes may be made therein without departing from the broader spirit and scope of the invention as set forth in the appended claims. Moreover, the terms "front," "back," "top," "bottom ," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of step in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality. Furthermore, those skilled in the art will recognize that boundaries between the above described steps are merely illustrative. The multiple may be combined into a single step, a single step may be distributed in additional steps and steps may be executed at least partially overlapping in time. Moreover, alternative embodiments may include multiple instances of a particular step, and the order of steps may be altered in various other embodiments. Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The terms "including", "comprising", "having", "consisting" and "consisting essentially of" are used in an interchangeable manner. For example—any method may include at least the steps included in the figures and/or in the specification, only the steps included in the figures and/or the specification. While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A system comprising:
   a vacuum chamber that defines a vacuum space;
   a transmission system including a bearing and a rail positioned within the vacuum space, the bearing being slidably coupled to the rail and including a first fluid reservoir fluidly coupled to the bearing and configured to store a first volume of lubricant
   a lubrication system coupled to the bearing and disposed in the vacuum chamber, the lubrication system including a second reservoir configured to store a second volume of lubricant at least three times larger than the first volume; and
   a lubricant distribution system operatively coupled between the first and second reservoirs to deliver lubricant from the second reservoir to the first reservoir to refill the first reservoir while bearing and the lubrication system are positioned within the vacuum chamber;
   wherein the lubrication system comprises a housing that defines a recess at an upper surface of the lubrication system and further includes an electrical pump disposed within the recess and configured to provide a small volumetric flow of lubricant to the first reservoir in a stable, controllable and repeatable manner.

2. The system according to claim 1 wherein the rail includes first and second opposing sides that extend along a length of the rail and the lubrication system includes inner walls and sidewalls that combine to define an interior space of the first reservoir that partially surrounds the first and second sides of the rail.

3. The system according to claim 2 wherein the interior space has a generally u-shaped cross-section.

4. The system according to claim 1 wherein the distribution system comprises a valve.

5. The system according to claim 1 wherein the distribution system comprises a lubrication liquid flow control unit that is positioned below the lubrication system reservoir.

6. The system according to claim 1 wherein the lubrication system is configured to perform the refill at an average rate that is below 1 cubic centimeter per month.

7. The system according to claim 1, wherein the distribution system comprises a lubrication liquid flow control unit that is attached to the housing.

8. The system according to claim 7, wherein the lubrication liquid flow control unit is positioned within a space defined by the housing.

9. The system according to claim 8, wherein the lubrication liquid flow control unit is positioned above the lubrication system reservoir.

10. A method for lubricating a transmission system that includes first and second components positioned within a vacuum space defined by a vacuum chamber, wherein the first component is a bearing slidably coupled to the second component, which is a rail, and the transmission system includes a first fluid reservoir fluidly coupled to the first component and configured to store a first volume of lubricant, the method system comprising:
   storing a second volume of lubricant in a second reservoir of a lubrication system coupled to the first component of the transmission system and disposed in the vacuum chamber, wherein the second volume of lubricant is at least three times larger than the first volume;
   refilling, while the first transmission system component and the lubrication system are positioned within the vacuum chamber, the first reservoir from the second reservoir with a lubrication system operatively coupled between the first and second reservoirs
   wherein the lubrication system comprises a housing that defines a recess at an upper surface of the lubrication system and further includes an electrical pump disposed within the recess and configured to provide a small volumetric flow of lubricant to the first reservoir in a stable, controllable and repeatable manner.

* * * * *